INVENTOR.
ROBERT CASPER SWANEY
BY John B Brady
ATTORNEY

INVENTOR.
ROBERT CASPER SWANEY

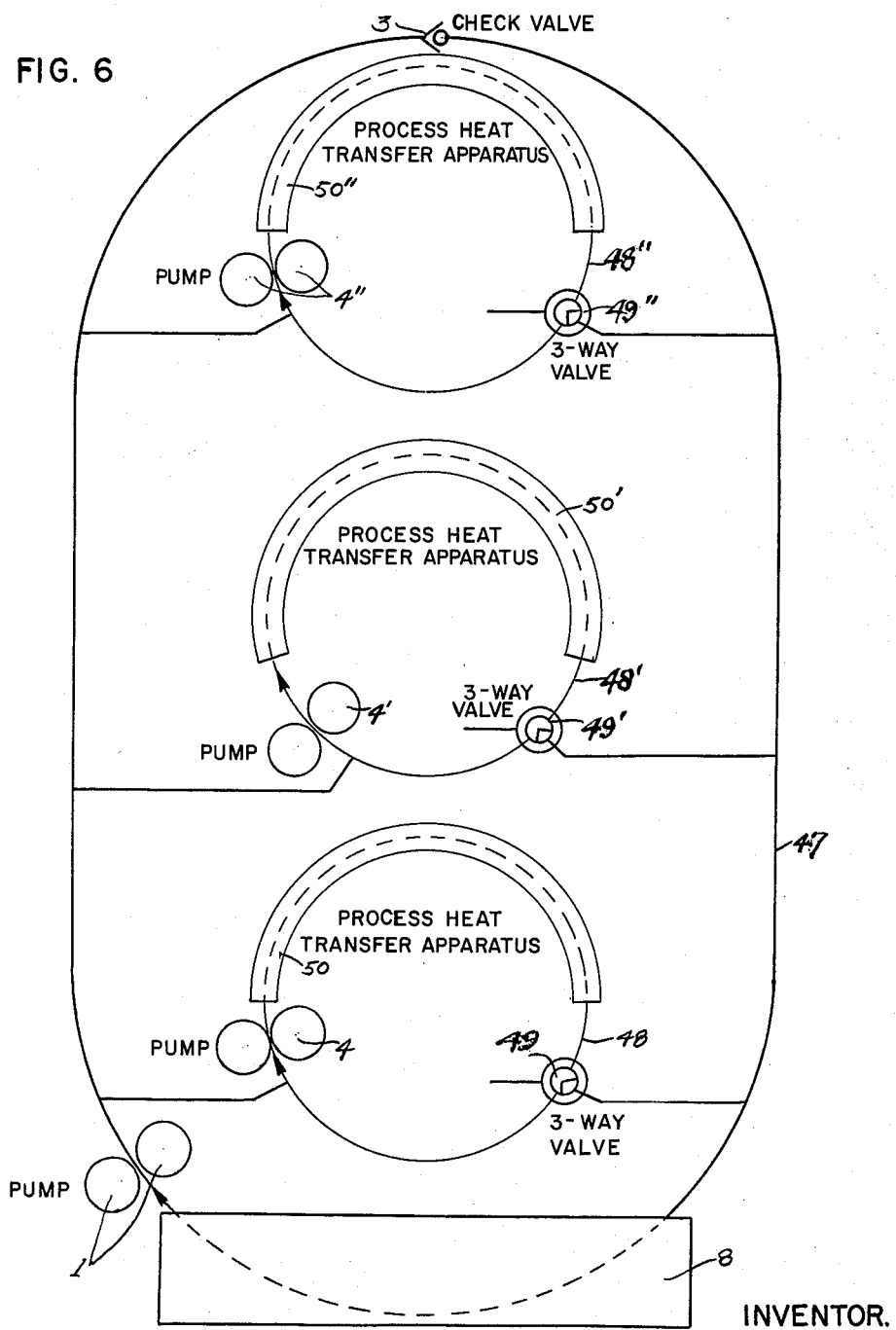

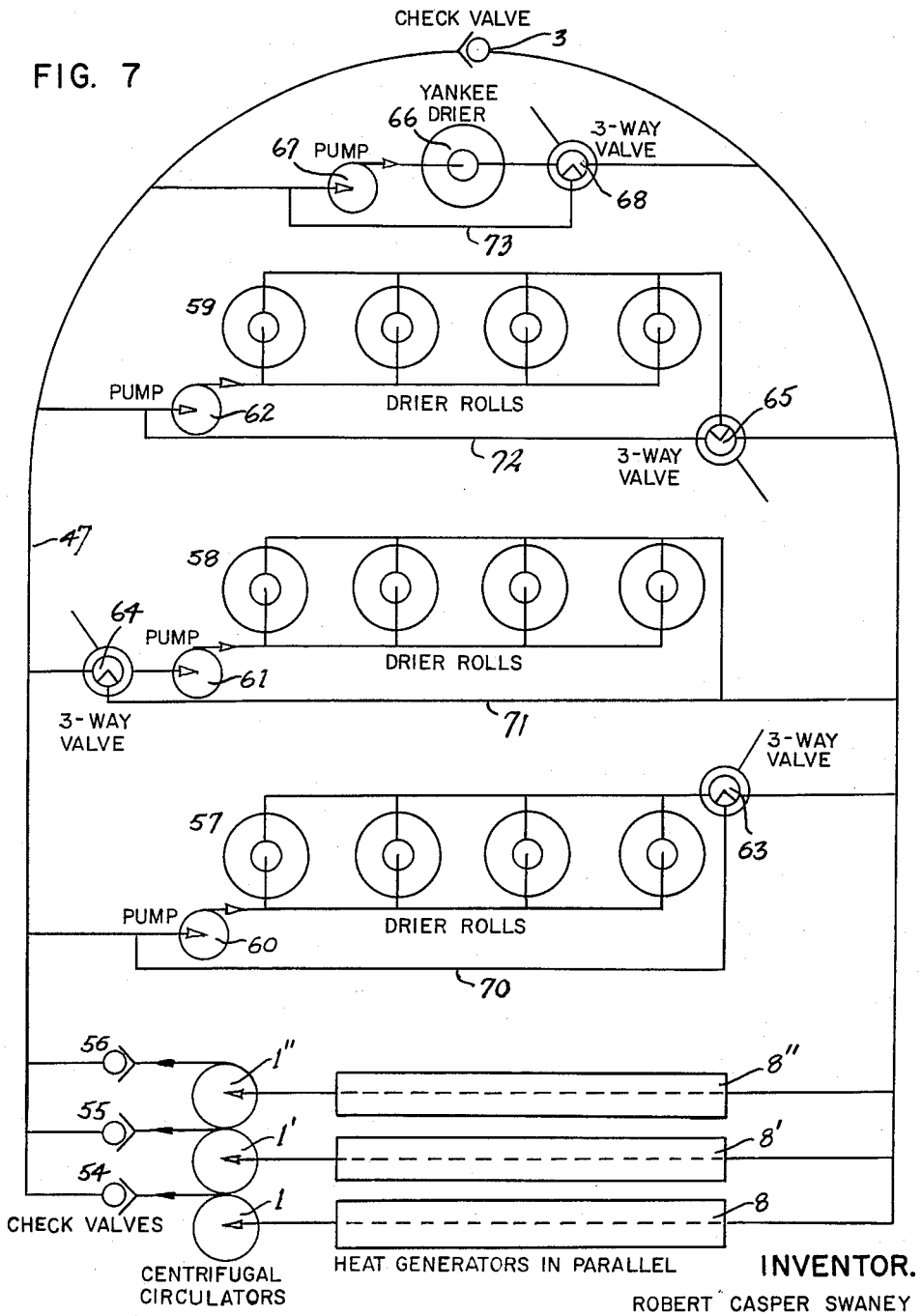

United States Patent Office 3,119,560
Patented Jan. 28, 1964

3,119,560
SYSTEM OF PROPORTIONAL RECIRCULATION AND ZONE CONTROL USING LIQUID HEAT TRANSFER MEDIA IN PAPER DRIERS
Robert Casper Swaney, 241 Belvedere St., Carlisle, Pa.
Filed Nov. 5, 1957, Ser. No. 694,576
5 Claims. (Cl. 237—56)

My invention relates broadly to a system of proportional recirculation and zone control using liquid transfer media in paper driers and more particularly to a new and novel method of applying heat to the drier sections of paper-making and like machines, to improve production by increasing the drying rate, improve quality by providing more accurate control of temperatures, and to make such apparatus safer and less hazardous.

One of the objects of my invention is to provide a system of proportional recirculation and zone control using liquid heat transfer media in paper driers for the precision temperature control progressively through the drying rolls of a paper drier.

Another object of my invention is to provide a system for dividing the circulatory path for heating media in groups of drier rolls in a paper machine into primary and secondary loops with a pair of communicating means between the primary and secondary loops, with a flow distribution means at the junction of one of the loops and one of the communicating means for isolating the flows and controlling the intermingling of the flows of the heating media circulating in the primary and secondary loops.

Another object of my invention is to provide a heat transfer system for roll-type driers in which there are primary and secondary heat transfer circulating loop arrangements with means for continuously circulating a liquid heat transfer medium through the primary circulating loop arrangement with a pair of communicating means between the primary and secondary circulating loop arrangements and a flow distribution means disposed at the junction of one of the circulating loop arrangements and one of the communicating means for isolating the flows and controlling the intermingling of the flows of the heat transfer medium circulating in the primary and secondary loop arrangements.

Still another object of my invention is to provide a heat transfer system for groups of rolls in related sections of a paper machine and for individual rolls in at least one section of the paper machine by which a temperature gradient may be maintained through the machine progressively from the wet end to the dry end thereof by controlled flow of a heat transfer medium.

Still another object of my invention is to provide a heat transfer system for circulating the liquid heat transfer medium continuously through a multiplicity of drier rolls in a paper or other machine in paths constituted by related primary and secondary circulating loop arrangements in a paper machine in combination with controls operated both by the temperature of the drier rolls and the moisture in the paper web operating over the drier rolls for regulating the flow of the heat transfer medium through the drier rolls.

Other and further objects of my invention are to provide means for controlling the circulation of liquid heat transfer media through related zones of drier rolls and individual rolls in certain zones of a roll drier system according to the moisture content in a paper web material moving over the drier rolls as set forth more fully in the specification hereafter following by reference to the accompanying drawings in which:

FIG. 1 is a schematic and diagrammatic arrangement of a paper machine showing the application of the system of proportional recirculation and zone control using liquid transfer media in accordance with the principles of my invention;

FIG. 2 diagrammatically illustrates the manner of connecting a multiple number of heat transfer units embodying my invention on a single liquid heating system for operating a multiplicity of paper machines in a paper plant;

FIG. 6 is another theoretical diagram showing the relationship of the individual secondary circulating loop arrangements to the primary circulating loop arrangement in the heat transfer system of my invention;

FIG. 7 is a further theoretical diagram showing the application of the proportional recirculation and control system of my invention through a multiplicity of zones of drier rolls in a paper-making machine;

FIG. 8 is a schematic view of the control means which are operated by the condition of moisture in the paper web delivered by the dry end of the paper-making machine for controlling by zones and by individual rolls the temperature conditions in the drier rolls for correspondingly controlling the functioning of the paper-making machine.

My invention is directed to a system for the proportional recirculation and zone control of liquid heat transfer media in the rolls of paper driers by which predetermined temperature gradients may be obtained through the machine for the precision production of paper. By use of the control system of my invention more accurate and flexible controls are obtained in the operation of the paper machine and better quality paper may be secured. The controls of my invention insure increased production of paper under conditions of safer operation. The quality of the paper may be predicted over an extended paper production run by reason of the precision controls afforded by the system of my invention.

My invention provides an arrangement of pumps which develop the circulation of heat transfer medium in a paper drier. I prefer to employ centrifugal circulators for the circulation of the heat transfer medium but positive displacement pumps can also be used very effectively. Various types of circulators may be employed in the system of my invention and the circulators shown herein are to be considered in the illustrative sense and not in the limiting sense. The heating apparatus may be any practicable generator capable of delivering heat units into the liquid heat transfer medium being used.

Figure 1:
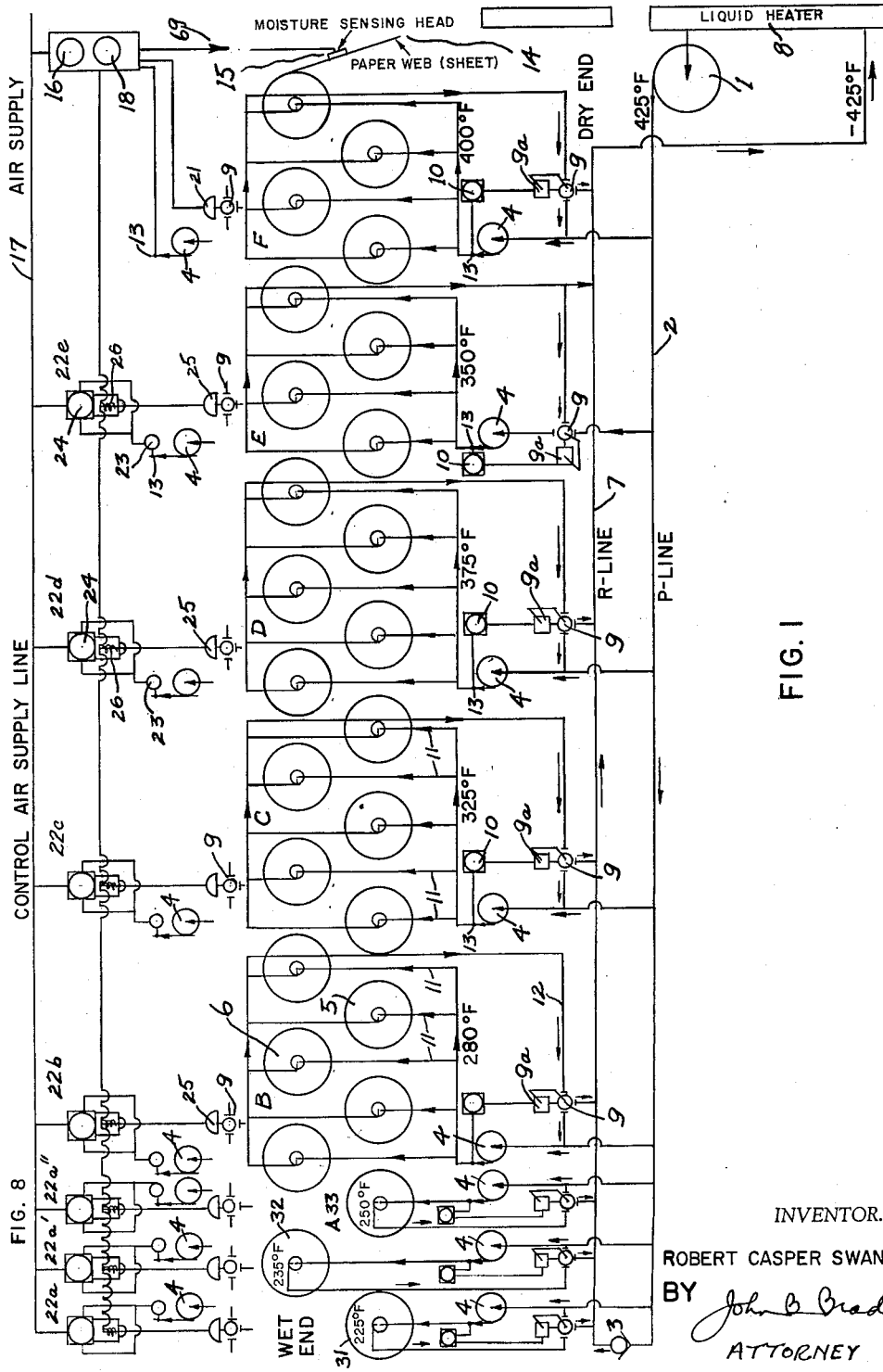

As shown in FIG. 1 the entrance and exit of the heat transfer medium into and out of the drier rolls is common through the same journal as indicated by the dual flow journals at the centers of the drier rolls although I may arrange the intake of the heat transfer media in the course of the circulation thereof through the rolls at one end of the roll with the discharge location at the other end of the roll. My invention is not restricted to how or where the heat transfer medium enters the roll or flows through and out of the roll and various alternative arrangements for effecting the circulation of the heat transfer medium through the rolls may be employed.

The controls shown in FIG. 1 provide for automatic operation of the heat transfer system insuring efficiency of the operation of the system. However the system can also be manually controlled very effectively.

I apply the system of my invention to groups of rolls in the drier sections of a paper machine and to individual rolls in at least one of the drier sections. In FIGS. 1 I have shown the manner of controlling the circulation of the heat transfer medium through the groups of rolls or through individual rolls of at least one group by automatic control. The groups of rolls are shown at the wet end of the machine in section A arranged for individual roll control while the rolls that are temperature controlled as a plurality or multiplicity in a group are shown at B, C, D, E and F.

The system as shown in FIG. 1 comprises a primary circulator 1, preferably of the centrifugal type which continuously circulates a supply of heat transfer medium from the heat generator or liquid heater 8 into the P-line, designated at 2 through the check valve 3 and/or the secondary circulators designated at 4 to the drier rolls indicated at 5 and 6. The rate of circulation controlled by the primary circulator 1 and the several secondary circulators 4 depends upon the heat load or the requirements of the drier sections discharging into the R-line 7 back into the heat generator or liquid heater 8, for heat make-up as required by the drier sections. A secondary circulating loop is provided for the individual rolls 31, 32 and 33 of section A of the drier. Another secondary circulating loop is provided for each of the groups of drier rolls B, C, D, E, and F as shown. These secondary circulating loops provide a proportional recirculating group of apparatuses for each drier roll or group of drier rolls to be heated comprising a circulator 4, parallel piping 11, to and from each drier roll 5, 6 in the group to the three-way flow control or diversion valve designated 9 through discharge pipe from the group of rolls shown at 12. In installations where automatic control is provided the system also includes the necessary instruments and operator for the three-way valve 9 such as the temperature controller 10 associated with the thermocouple or other temperature sensing element shown at 13. In the arrangement shown at FIG. 1 I have indicated a motorized control 9a for the three-way flow control or diversion valve 9. In the arrangement shown in FIG. 8 the operator for the three-way valve may be the air operated device 21 or 25.

The main circulator 1 operates continuously delivering a constant flow of heat transfer medium, the rate being uniform at the discharge from the main circulator 1 and at the return to the heat generator 8, but the rate of flow will vary from station to station along P-line 2, R-line 7 and through the check valve 3 depending upon the heat load or work performed by the respective driers 31, 32, 33, 5, 6 or groups of driers in the drier sections A–F. The secondary circulators 4 in the proportional recirculating groups of rolls run continuously each circulating a constant rate or mass of heat transfer medium through the drier roll or rolls 5—6 it serves, by way of the parallel piping 11 to and from each drier; the return 12 from the drier or driers is piped to a three-way flow control or diversion valve 9, usually the three-way valve is the type which will open all three ways forming a T and does not shut off more than one port or its equivalent in any position; thus: as illustrated the flow is into one opening on the run of the T and depending upon the valve setting all of the discharge from the three-way valve will be out of the branch or all of it out of the opposite end of the run, or, the valve may be varied and set so that any part of the flow will be out of the branch and the balance out of the opposite opening on the run. The three-way valve may be positioned manually or automatically as required.

Therefore, up to the capacity of the heat generator and the ability of the heat transfer medium to transport and transfer heat, any desired temperature and quantity of heat units can be delivered to each drier or group of driers. If manually controlled this is accomplished by properly setting or adjusting the respective three-way flow control or diversion valves 9. Any one of the three-way valves can be changed or set at any time independently and without affecting the rest of the driers or groups of driers. Where a group of driers is piped in parallel each may be varied to some extent by adjusting the mass flow of heat transfer medium through each drier by means of valves in their respective lines, orifice discs, or any other convenient means that will effect pressure drop in varying degrees through each drier. It is usually desirable to have each drier in a group at the same temperature and the circulator, piping, valves, etc. in each group should be so sized that the flow rate through each drier and the resistance through each drier will be such that, or can be adjusted that, the mass flow of heat transfer medium through each drier will be equal or nearly enough exactly equal as to be within the acceptable or desired tolerance. Once this has been established the temperature of the heat transfer medium in each drier or group of driers can be varied at any time by setting or adjusting its respective three-way flow control valve; without changing any of the rest of the drier section.

This system permits the utmost in flexibility and control; for example, the heat generator may be set to operate at 425° F. The main circulator 1 delivers a constant mass of 425° F. heat transfer medium into the path 2, 4, 11, 5, 6, 12, 9, 7, 8 usually at about 10 p.s.i.g. pressure; just enough pressure to assure adequate supply to the proportional recirculating groups. It is usually necessary to control the temperature of the driers at the wet end shown at the left of the diagram in FIG. 1 at lower temperatures than at the dry end shown at the right in FIG. 1; for example, 225° F. to 250° F. Therefore these driers will have a high rate of recirculation with very little make-up of 425° F. heat transfer medium; the three-way valves 9 set so only a small portion is returned and the makeup in the same proportion. But as the paper advances from the wet end of the drier to the dry end of the drier it becomes warmer and drier and requires higher temperatures in the groups or zones of drier rolls toward the dry end of the paper machine. Thus the succeeding driers and groups of driers can be heated to higher temperatures which require higher temperatures in the heat transfer medium. Thus as the temperatures increase a lesser portion of the heat transfer medium is recirculating within the driers or groups of driers and more make-up of 425° F. heat transfer medium is required and a larger portion is returned to the heat generator 8 for make-up of heat used in the driers. The temperature for any drier or group of driers served by a proportional circulating circuit can be changed by resetting or readjusting the associated three-way valve 9.

When the proportional recirculating apparatus is automatically controlled the workload on the drier section can be varied and the temperatures will be maintained automatically throughout the drier section.

My invention provides a thermocouple or other temperature sensing element 13 located in the discharge from the associated secondary circulator 4 or in some convenient or desirable point in the working circuit which requires a control instrument, and which in turn pilots an operator such as the motor unit 9a of the three-way control valve 9. Thus the temperature of the circuit can be changed by resetting the control point on the controller. In lieu of this method of control or in addition thereto I may provide the sensing device arrangement 15 on the web of paper as shown in FIG. 1 for controlling temperatures through the arrangement represented in FIG. 8. This instrumentation provides an automatic control system based upon sensing the moisture content of the finished paper represented at 14. Alternately the control may be based upon sensing the temperature of the finished paper or the temperature of the drier roll surface or any other function through a suitable master control instrument such as shown in FIG. 8.

The moisture sensing head shown at 15 in FIG. 1 contacts the paper web or sheet 14 continuously and senses and reports the moisture content of the paper to the master controller 16 shown in FIG. 8 which in this instance is a moisture control instrument which controls the air supply line designated at 17. If the moisture is above or below the moisture control point the master control 16 resets the control point on another control instrument 18, in this case a temperature controller of the duplex receiver type which receives a continuous temperature report from the thermocouple or other temperature sensing element 13 sensing the heat transfer medium discharging from the circulator 4 to the last group F of driers and pilots the operator 21 according to the moisture content or temperature of the paper at the dry end of the machine to correspondingly position the air operated three-way flow control valve 9.

The proportional recirculating groups 22a, 22a', 22a", 22b, 22c, 22d, and 22e serving all the preceding driers in the section each has a sensing element 13 associated therewith which continuously senses and reports the temperature of the heat transfer medium discharging from the associated circulator 4 to the drier or driers to a temperature transmitter 23 which converts and relays the temperature impulse of a signal to a dual controller 24 which in turn pilots the operator 25 to accordingly position the three-way flow control valve 9 under air control. Normally the final group of driers compensates for moisture variation with the previous driers and groups of driers controlled at selected or determined optimum respective temperatures. Each of the dual controllers 23 has two control points: the higher temperature usually constituting the control point when effecting the drying of the paper and the lower temperature constituting the control point in the case of a paper break. Both control units in each dual controller 24 emits a continuous air signal to the operator 21 or 25 of the three-way control valve 9, but the position of the three-way solenoid valve 26 associated with dual controller 24 determines which air signal is permitted to pilot the operator 21 or 25 of the three-way flow control valve. The duplex receiver controller 18 serving the last group of driers also has a second control unit usually set at a lower temperature and a solenoid three-way air valve 21 associated therewith which shifts in position in case of a paper break and reduces the temperature in the final driers in section F. Thus, when the master moisture controller 16 senses a paper break, that is, it receives no moisture report from the moisture sensing head 15, it immediately closes a circuit shifting all the three-way solenoid valves such as 26 and the one in the duplex receiver controller 18 serving the final driers and the dual controllers 24 serving all the preceding driers, so that all driers operate at reduced temperatures until continuous drying is reestablished and then when the moisture sensing head 15 again reports the moisture content of the paper, the master moisture control 16 transfers contacts which opens the circuit allowing all the three-way solenoid valves 26 and the one in the duplex receiver controller 18 to return to the proper position for controlling the driers at the temperatures for drying the paper.

I may also employ a series of ratio relays between each proportional recirculating group whereby all the previous driers are proportionally set to follow the same relationship to the final group of driers as the temperature of the final driers is varied in response to the master moisture controller 16.

Usually the liquid heat transfer medium flows through the proportional recirculating circuits 2, 4, 11, 5, 6, 12, 9, 7 and 8 at about 10 p.s.i.g.; just enough to pick up the liquid from the P-line 2, overcome resistance through the circuit and return the spent liquid to the R-line 7. Thus, very wide ranges of temperature are available with only very negligible variation in pressure. Temperatures readily available by use of my invention in operating the driers at only a few p.s.i.g. pressure would require over 1000 p.s.i.g. pressure with saturated steam and moderate temperature changes, would require extreme pressure changes.

The circulating path 2, 4, 11, 5, 6, 12, 9, 7 and 8 is equipped with the check valve 3 between the supply and return to the proportional recirculating circuit farthest away to prevent short-circuiting between the P-line 2 and R-line 7. As the heat load on the drier section is increased, the less heat transfer medium will flow through the check valve 3 and vice versa.

Any number of drier sections may be served from a single system of my invention and any number of heat generators may be connected in parallel to a single system of my invention and operate fully automatically providing a check valve is installed in the discharge from each primary circulator before discharging into the header for the P-line. There need be no special devices in the return lines to the heat generators from the R-line header.

Figure 2:
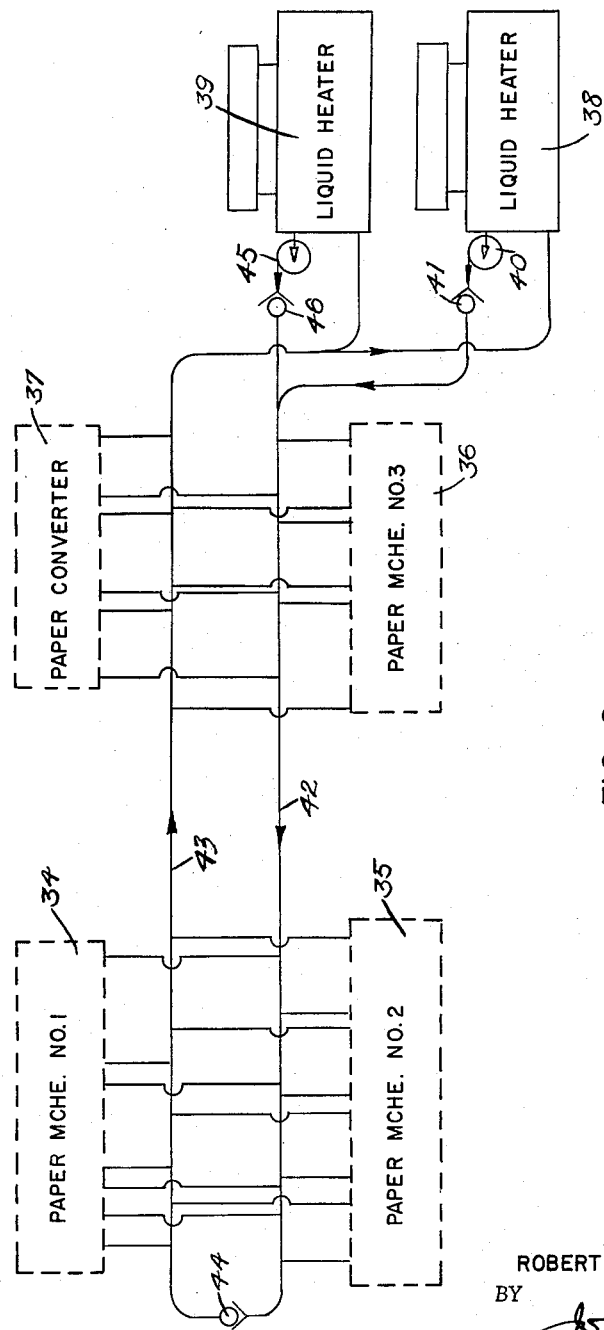

In FIG. 2 I have illustrated the manner in which a multiplicity of the control systems of my invention may be coordinated in operating upon a multiplicity of paper machines such as the paper machines Nos. 1, 2, 3, and the paper converter shown at 34, 35, 36 and 37. The heat transfer medium is delivered to the several paper machines and the converter from the liquid heaters shown at 38 and 39 operating in parallel. The circuit from the heat generating source 38 extends through primary circulator 40, check valve 41 and the primary loop circuit 42 and the return circuit 43 isolated through check valve 44. The liquid heat transfer medium from the source 39 is circulated by primary circulator 45 through check valve 46 operating into the primary loop circuit 42.

Figure 3:
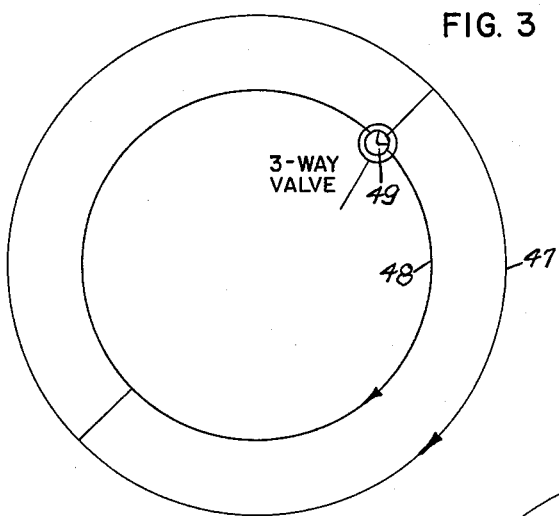
FIG. 3 is a theoretical view explaining the basic principles of the proportional recirculation and control system of my invention.

FIG. 3 is a theoretical diagram showing the primary circulating loop arrangement 47 associated with the secondary circulating loop arrangement 48 with the three-way valve schematically shown in position at 49 therebetween.

Figure 4:
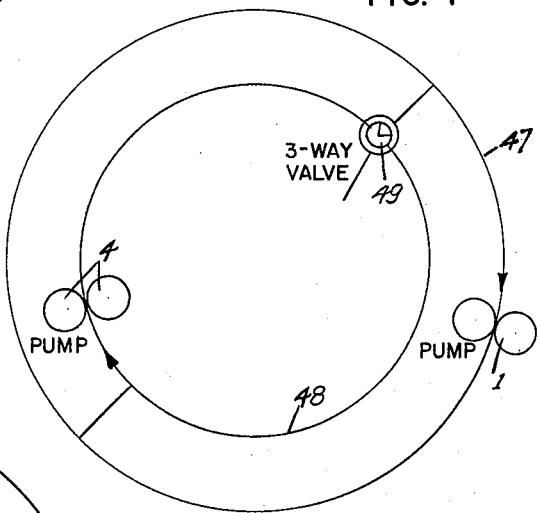
FIG. 4 is a further theoretical diagram showing the arrangement of the primary and secondary circulating loop arrangements employed in the heat transfer system of my invention.

In FIG. 4 I have shown the manner in which mechanical circulating means such as pump 1 establishes and sustains circulation of the liquid heat transfer medium in the primary circulating loop arrangement 47 while the pump 4 establishes and sustains circulation of the liquid heat transfer medium in the secondary circulating loop arrangement 48 with the three-way valve 49 associated with the loop arrangements.

Figure 5:
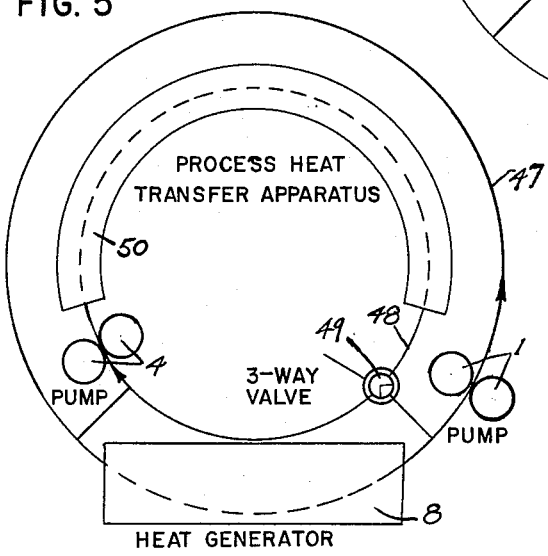
FIG. 5 is a further theoretical diagram showing the principles embodied in the system of my invention.

In FIG. 5 I have shown the manner in which the heat generator 8 is associated with both of the circulating loop arrangements and the process heat transfer apparatus associated with the secondary circulating loop arrangement 48 as indicated at 50 with the pumps 1 and 4 and the three-way valve 49 arranged as explained in connection with FIG. 4.

In FIG. 6 I have illustrated the manner in which a multiplicity of secondary circulating loop arrangements are associated with the primary circulating loop arrangement 47 supplied from heat generator 8 and the heat transfer medium circulated therein by pump 1 with the check valve 3 disposed in the path thereof. The three secondary loop arrangements connected in accordance with the principles of my invention are shown at 48, 48' and 48", each associated with the components explained in connection with FIG. 5, that is, the pump 4, the process heat transfer apparatus 50 and the three-way valve 49. The components in the secondary loop arrangements 48' and 48" are the same and have been indicated by reference characters 4', 50', and 49'; and 4", 50", and 49".

In FIG. 7 I have shown the system of my invention wherein a multiplicity of generators may be connected in parallel at 8, 8' and 8" for supplying the primary circulating loop arrangement 47 through the primary centrifugal circulators 1, 1', and 1" associated with check valves 54, 55 and 56 for insuring unidirectional flow through the parallel branches 8, 8' and 8". The check valve 3 is provided in the primary circulating loop arrangement 47 as heretofore explained. The drier rolls are arranged in groups shown at 57, 58 and 59 and the groups are connected in parallel. Each group of drier rolls includes a circulator pump designated at 60, 61 and 62 arranged in a secondary loop arrangement which includes the three-way valves 63, 64 and 65, and re-circulating by-passes 70, 71 and 72. In addition to the parallel groups of drier rolls shown, I may also provide a secondary loop arrangement which includes the Yankee drier shown at 66 and connected in a series path with a circulator pump 67, a three-way valve 68 and a by-pass 73. It will be readily seen that the available supply of heat may be increased or decreased by the parallel arrangement of generators 8, 8' and 8" as shown in FIG. 7 and that the available supply may be tapped by the parallel disposition of the secondary loop arrangements including the drier rolls 57, 58, 59 and the Yankee drier 66.

In the control circuit illustrated in FIG. 8, there are separate circulator systems for the individual rolls shown in FIG. 1 at A and an individual circulator system for the groups of rolls B, C, D, E and F shown in FIG. 1 and each of these circulator systems are controlled in operation by the air supply conducted through supply line 17. The several controls heretofore described insure the precision determination of temperature of the drier rolls according to the moisture content of the paper web 14 moving over the rolls as sensed by the moisture sensing head 15. The lead shown at 69 in FIG. 8 extends to the moisture sensing head 15 in FIG. 1. Only a sufficient portion of the control circuits for the circulators 4 have been illustrated in FIG. 8 to set forth the principles of my invention, but it will be understood that the system of FIG. 8 is completed like the system of FIG. 1 in carrying out my invention.

The advantages of my invention are that more accurate and flexible controls are provided to insure a better quality paper product. Increased production is obtained and safer operation of the equipment is insured.

While I have described my invention in certain of its preferred embodiments, I realize that modifications may be made and I desire that it be understood that no limitations upon my invention are intended other than may be imposed by the scope of the appended claims.

What I claim as new and desire to secure by Letters Patent of the United States, is as follows:

1. In a paper making machine, a plurality of paper drying rolls arranged in groups with a plurality of rolls in each group and each group forming successive paper drying zones through which a paper web passes from the wet end of the machine with the moisture content being reduced in each successive zone, a primary liquid conduit formed in a single continuous loop, a liquid heater connected in said loop for heating liquid to a predetermined constant temperature, a constant flow pump connected in said loop for circulating liquid through the loop at a constant rate so that the temperature of supply liquid will remain constant, a plurality of secondary loops each serving one of said groups of rolls with each secondary loop having an inlet and a discharge connected to said primary loop with the inlet connected upstream of the discharge, individual constant flow rate pumps in each of said secondary loops, individual lines for each of the rolls in the groups leading through each drier roll and having an inlet and a discharge connected to the secondary loop for the respective group of drying rolls with each of the inlets connected upstream of each of the discharge lines and with each line for a group of driers having the same pressure drop characteristic for uniform mass flow through each of the drier rolls of a group, and a three-way control valve connected between the inlet and outlet of each secondary loop downstream of the discharge of said individual lines and having a by-pass discharge connected to the secondary loop inlet so that a portion or all of the liquid from the discharge of the secondary loop may be recirculated.

2. In a paper making machine, a plurality of paper drying rolls arranged in groups with a plurality of rolls in each group and each group forming successive paper drying zones through which a paper web passes from the wet end of the machine with the moisture content being reduced in each successive zone, a primary liquid conduit formed in a single continuous loop, a liquid heater connected in said loop for heating liquid to a predetermined constant temperature, a constant flow pump connected in said loop for circulating liquid through the loop at a constant rate so that the temperature of supply liquid will remain constant, a plurality of secondary loops each serving one of said groups of rolls with each secondary loop having an inlet and a discharge connected to said primary loop with the inlet connected upstream of the discharge, a reverse flow preventing check valve connected in said primary conduit and positioned between said inlets and said discharges of the secondary loops so that discharges from the secondary loops will not cause reverse flow through the primary loop, individual constant flow rate pumps in each of said secondary loops, individual lines for each of the rolls in the groups leading through each drier roll and having an inlet and a discharge connected to the secondary loop for the respective group of drying rolls with each of the inlets connected upstream of each of the discharge lines and with each line for a group of driers having the same pressure drop characteristic for uniform mass flow through each of the drier rolls of a group, and a three-way control valve connected between the inlet and outlet of each secondary loop downstream of the discharge of said individual lines and having a by-pass discharge connected to the secondary loop inlet so that a portion or all of the liquid from the discharge of the secondary loop may be recirculated.

3. A heat transfer system of apparatus comprising a continuous closed circuit primary circulating loop arrangement through which a liquid heat transfer medium continuously circulates, a continuous closed circuit secondary circulating loop arrangement connected transversely of said primary circulating loop arrangement by a pair of communicating means between the primary and secondary circulating loop arrangements, a flow distribution means at the junction of one of the circulating loop arrangements and one of the communicating means for isolating the flows and controlling the intermingling of the flows of the heat transfer medium circulating in the primary and secondary loop arrangements, and means in said closed circuit primary circulating loop arrangement symmetrically disposed intermediate the connections of said secondary circulating loop arrangement with said primary circulating loop arrangement for maintaining circulation unidirectionally through both said secondary circulating loop arrangement and the primary circulating loop arrangement.

4. A heat transfer system for the drier rolls of paper-making machines comprising a plurality of coacting drier rolls divided into groups progressing from the wet end of a paper-making machine to the dry end thereof, separate continuous closed circuit secondary circulating loops for heat transfer medium individual to each of the groups of rolls, a continuous closed circuit primary circulating loop arrangement including a supply line and a return line extending adjacent all of said groups of drier rolls for unidirectionally circulating a heat transfer medium, a heat generator connected with said primary circulating loop, means connecting said secondary circulating loop at spaced intervals across the supply and return lines of said primary circulating loop, individually adjustable means located in each of said secondary circulating loops for automatically regulating the temperature of the heat transfer medium circulating in each of said secondary circulating loops for establishing a temperature gradient in the said groups of drier rolls extending from the wet end of said paper-making machine to the dry end thereof, and means disposed between the ends of said supply and return lines and disposed symmetrically with respect to the connections of said continuous closed circuit secondary circulating loops with said closed circuit primary circulating loop for maintaining the circulation through said continuous primary circulating loop unidirectionally.

5. A heat transfer system of apparatus comprising a closed circuit primary loop arrangement in which a liquid heat transfer medium continuously circulates from a heat generator and back to said heat generator, a plurality of secondary circulating loop arrangements, each having a supply and a return communicating means between it and said primary circulating loop arrangement, a flow distribution means installed at the junction of each of the secondary circulating loop arrangements with one of its communicating means to said closed circuit primary circulating loop arrangement for isolating the flows and to regulate the intermingling of the flows of the heat transfer medium in the primary and secondary circulating loop arrangements, all of said secondary circulating loop arrangements and their respective communicating means with said primary circulating loop arrangement being connected in parallel with each other to said primary circulating loop arrangement, and a unidirectional check means installed in said closed circuit primary circulating loop arrangement at a point between the junctions of all of said supply communicating means and the junctions of all of said return communicating means between said secondary circulating loop arrangements and said closed circuit primary circulating loop arrangement to prevent reverse circulation within part of the primary circulating loop arrangement.

References Cited in the file of this patent

UNITED STATES PATENTS

| | | |
|---|---|---|
| 1,542,100 | Rose | June 16, 1925 |
| 1,951,588 | Van Zandt | Mar. 20, 1934 |
| 2,780,206 | La Rocque et al. | Feb. 5, 1957 |
| 2,952,410 | MacKay | Sept. 13, 1960 |

FOREIGN PATENTS

| | | |
|---|---|---|
| 188,822 | Switzerland | Apr. 16, 1937 |

OTHER REFERENCES

Radiant Heating, by Adlam, published by The Industrial Press, 1949, New York, N.Y., pages 182–84.